United States Patent
Kanada et al.

(10) Patent No.: US 11,622,056 B2
(45) Date of Patent: Apr. 4, 2023

(54) IMAGE READING SYSTEM AND INFORMATION PROCESSING APPARATUS USING FOLDER-SPECIFIC READ SETTING INFORMATION

(71) Applicant: SEIKO EPSON CORPORATION, Tokyo (JP)

(72) Inventors: Kentaro Kanada, Ina (JP); Kiyoshi Mizukura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/653,156

(22) Filed: Mar. 2, 2022

(65) Prior Publication Data

US 2022/0286573 A1    Sep. 8, 2022

(30) Foreign Application Priority Data

Mar. 4, 2021   (JP) .............................. JP2021-034184

(51) Int. Cl.
    *H04N 1/00*    (2006.01)
(52) U.S. Cl.
    CPC ..... *H04N 1/00766* (2013.01); *H04N 1/00803* (2013.01); *H04N 1/00824* (2013.01); *H04N 1/00944* (2013.01); *H04N 1/00946* (2013.01)
(58) Field of Classification Search
    None
    See application file for complete search history.

(56) References Cited

U.S. PATENT DOCUMENTS

| 2007/0273933 A1* | 11/2007 | Tomita | H04N 1/3877 358/448 |
| 2008/0239387 A1* | 10/2008 | Otsuka | G06F 3/1285 358/1.15 |
| 2010/0179965 A1* | 7/2010 | Koshigaya | G06F 21/608 707/783 |
| 2012/0182580 A1* | 7/2012 | Yamashita | G06F 3/1203 358/1.16 |
| 2015/0189110 A1* | 7/2015 | Oishi | H04N 1/00514 358/1.14 |

FOREIGN PATENT DOCUMENTS

JP    2005-244663 A    9/2005

* cited by examiner

*Primary Examiner* — Miya J Williams
(74) *Attorney, Agent, or Firm* — Workman Nydegger

(57) ABSTRACT

A personal computer 1 includes a first communication interface mechanism 16 that communicates with a first scanner 2A, and a first memory 13 that stores first reading setting information 131A in a first folder 131. The first scanner 2A includes a reception unit 221 that receives instruction data CM instructing reading of an image for which the first folder 131 is specified as the storage destination for read data, an acquisition unit 222 that, when the reception unit 221 receives the instruction data CM, accesses to the first folder 131 of the personal computer 1 and acquires the first reading setting information 131A from the first folder 131, a setting unit 223 that sets a reading condition based on the first reading setting information 131A, and a reading unit 224 that reads out an image and generates read data under the reading condition.

6 Claims, 4 Drawing Sheets

IMAGE READING SYSTEM AND INFORMATION PROCESSING APPARATUS USING FOLDER-SPECIFIC READ SETTING INFORMATION

The present application is based on, and claims priority from JP Application Serial Number 2021-034184, filed Mar. 4, 2021, the disclosure of which is hereby incorporated by reference herein in its entirety.

BACKGROUND

1. Technical Field

The present disclosure relates to an image reading system and an information processing apparatus.

2. Related Art

There is known a technique of easily setting reading conditions for an image reading apparatus.

For example, JP-A-2005-244663 indicates that an image reading apparatus includes a reading method storage unit that stores a storage destination for image data in association with a reading method and, when the storage destination is specified, the image reading apparatus reads out a document by using the reading method stored in association with the storage destination and transmits the read data to the specified storage destination.

However, in the configuration described in JP-A-2005-244663, the image reading apparatus stores a reading method table in which storage destinations are associated with the corresponding reading methods. For this reason, when the number of available storage destinations is increased, the image reading apparatus needs to store a reading method table having a larger capacity.

SUMMARY

An aspect of the present disclosure for solving the above problem is an image reading system including a first image reading apparatus that reads out a document and an information processing apparatus configured to be connected to the first image reading apparatus. The information processing apparatus includes a communication interface unit configured to communicate with the first image reading apparatus and a storage unit that stores a storage destination folder having reading setting information. The first image reading apparatus includes a reception unit that receives a read instruction that specifies the storage destination folder as a storage destination of read data, an acquisition unit that, when the reception unit receives the read instruction, accesses to the storage destination folder of the information processing apparatus and acquires the reading setting information from the storage destination folder, a setting unit that sets a reading condition based on the reading setting information, and a reading unit that reads out the document and generates the read data under the reading condition.

Another aspect of the present disclosure for solving the above problem is an information processing apparatus configured to be connected to a first image reading apparatus that reads out a document and generates read data. The information processing apparatus includes a communication interface unit configured to communicate with the first image reading apparatus, a storage unit that stores a storage destination folder having reading setting information, and a communication control unit that transmits the reading setting information to the first image reading apparatus via the communication interface unit when the storage destination folder is accessed from the first image reading apparatus via the communication interface unit.

DESCRIPTION OF EXEMPLARY EMBODIMENTS

Embodiments of the present disclosure will be described with reference to the drawings.

Figure 1:
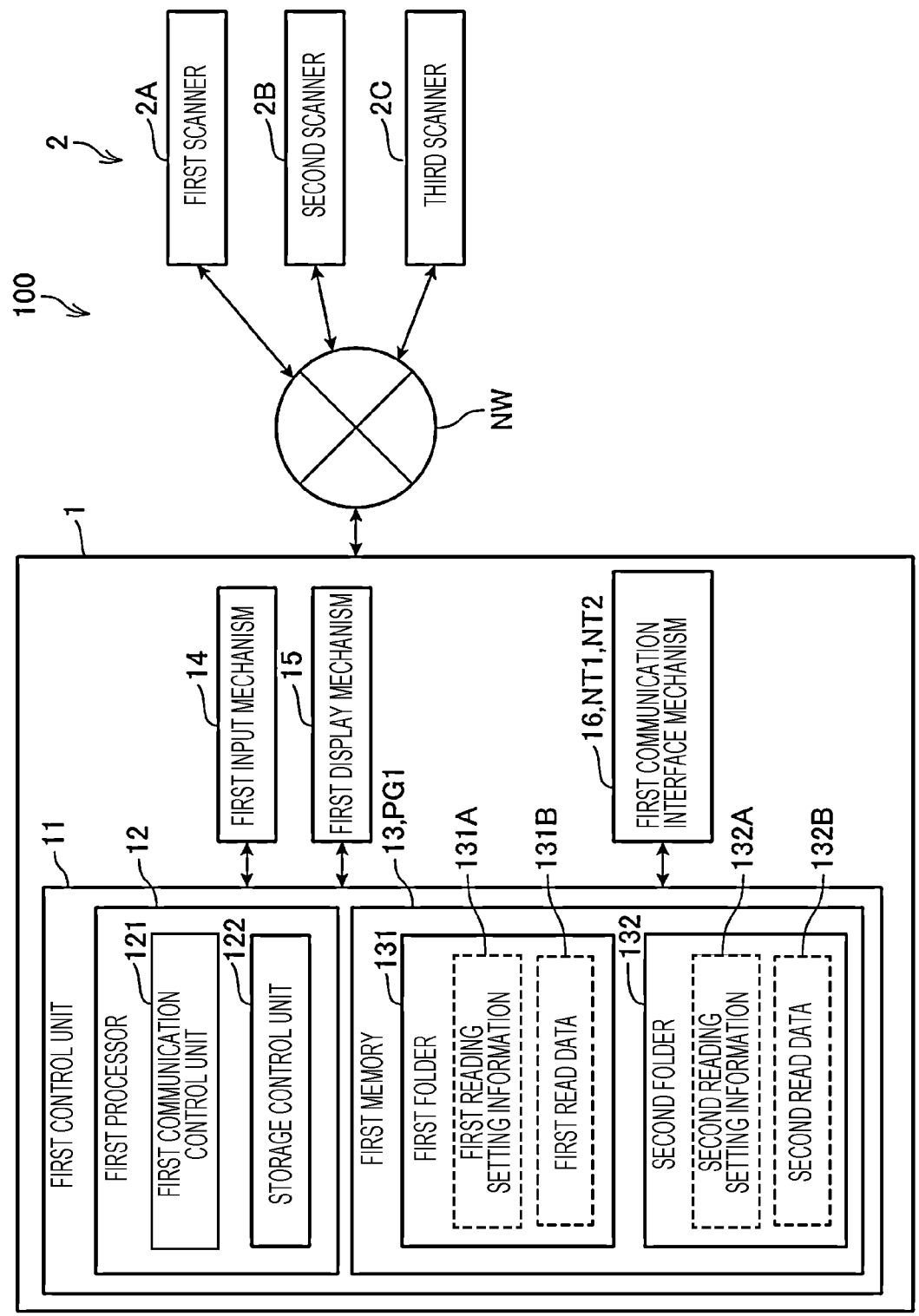
FIG. 1 is a diagram illustrating an example of an image reading system.

FIG. 1 is a diagram illustrating an example of an image reading system 100 including a configuration of a personal computer 1 according to a present embodiment.

The personal computer 1 is communicably connected to a scanner 2 via a network NW. The network NW is, for example, the Internet. The personal computer 1 transmits reading setting information to the scanner 2 via the network NW.

The scanner 2 sets a reading condition, reads out a document, and generates read data based on the reading setting information received from the personal computer 1. The scanner 2 stores generated read data in the personal computer 1.

The scanner 2 corresponds to an example of an "image reading apparatus".

Although the network NW is the Internet in the present embodiment, the network NW is not limited thereto. The network NW may be a local area network (LAN) or a wide area network (WAN).

The image reading system 100 of the present embodiment includes a first scanner 2A, a second scanner 2B, and a third scanner 2C. When there is no need to distinguish among the first scanner 2A, the second scanner 2B, and the third scanner 2C, each of the scanners is denoted as the scanner 2. Each of the scanners 2 is imparted with unique identification information 232 in advance. The unique identification information 232 is an Internet Protocol (IP) address or a printer name.

Figure 2:
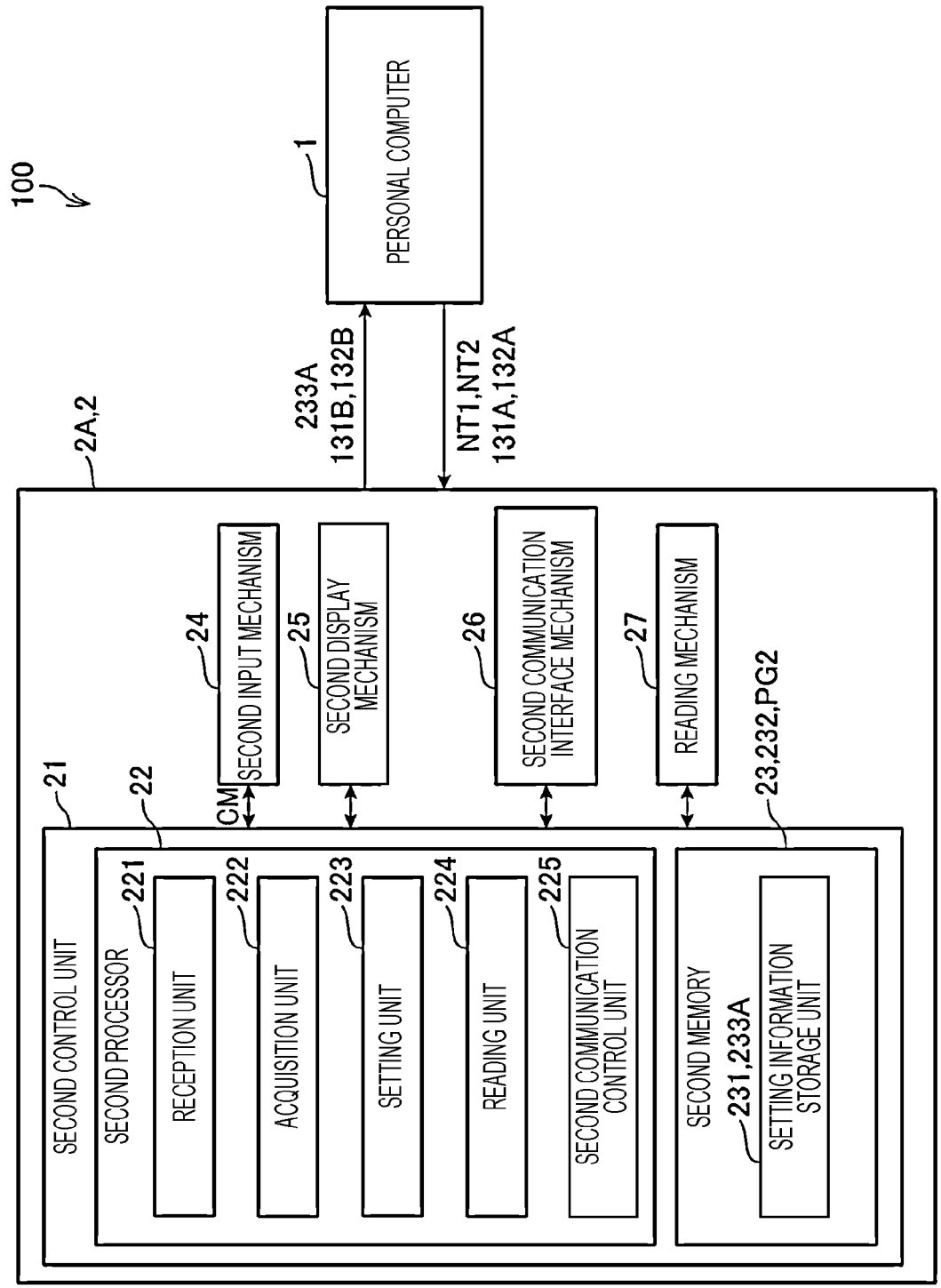
FIG. 2 is a diagram illustrating an example of a configuration of a scanner.

The unique identification information 232 is stored in a second memory 23 of each of the first scanner 2A, the second scanner 2B, and the third scanner 2C, as shown in FIG. 2.

The first scanner 2A corresponds to an example of a "first image reading apparatus".

The second scanner 2B corresponds to an example of a "second image reading apparatus".

The personal computer 1 determines the scanner 2 to transmit the reading setting information thereto based on the unique identification information 232 of the scanner 2. The scanner 2 generates read data having a predetermined format. The predetermined format may be Portable Document Format (PDF), Tagged Image File Format (TIFF), Joint Photographic Experts Group (JPEG) format, or other format.

The personal computer 1 includes a first control unit 11, a first input mechanism 14, a first display mechanism 15, and a first communication interface mechanism 16. Although the personal computer 1 includes the first input mechanism 14 and the first display mechanism 15, the first input mechanism 14 and the first display mechanism 15 may be provided separately from the personal computer 1.

The personal computer 1 corresponds to an example of an "information processing apparatus".

The first control unit 11 controls operation of each unit of the personal computer 1.

The first input mechanism 14 receives an input from a user, generates an input signal corresponding to the received input, and transmits the input signal to the first control unit 11. The first input mechanism 14 is a keyboard or a mouse. The first input mechanism 14 may be a device provided separately from the personal computer 1.

The first display mechanism 15 is a display device, such as a liquid crystal display (LCD). The first display mechanism 15 displays various images on the LCD according to instructions received from the first control unit 11.

The first communication interface mechanism 16 is configured to communicate with the scanner 2 via the network NW in accordance with an instruction received from the first control unit 11. The first communication interface mechanism 16 communicates with the scanner 2 in accordance with the Ethernet (registered trademark) standards.

The first communication interface mechanism 16 corresponds to an example of a "communication interface unit".

Although, in the present embodiment, the first communication interface mechanism 16 communicates with the scanner 2 in accordance with the Ethernet standards, the communication method is not limited thereto. The first communication interface mechanism 16 may communicate with the scanner 2 by wireless communication, such as Wi-Fi (registered trademark).

The first control unit 11 is a controller including a first processor 12 and a first memory 13.

The first memory 13 is a storage device that stores programs to be executed by the first processor 12 and data in a non-volatile manner. The first memory 13 is a magnetic storage device such as a hard disk drive (HDD), a semiconductor storage device such as a solid state drive (SSD), a semiconductor storage element such as a flash read only memory (ROM), or another kind of non-volatile storage device. The first memory 13 may include a random access memory (RAM) that forms a work area for the first processor 12. The first memory 13 stores data to be processed by the first control unit 11 and a first control program PG1 to be executed by the first processor 12.

The first processor 12 may be formed from a single processor, or a plurality of processors may be configured to function as the first processor 12. The first processor 12 controls each unit of the personal computer 1 by executing the first control program PG1.

Although, in the present embodiment, the first processor 12 controls each unit of the personal computer 1 by executing the first control program PG1, the first control unit 11 may control each unit of the personal computer 1 by executing processing of a function mounted on an application specific integrated circuit (ASIC) or by executing signal processing in a signal processing circuit.

The first control unit 11 includes a first communication control unit 121 and a storage control unit 122. Specifically, the first processor 12 functions as the first communication control unit 121 and the storage control unit 122 by executing the first control program PG1.

The first memory 13 stores a first folder 131 and a second folder 132.

The first folder 131 is configured so that first reading setting information 131A and first read data 131B can be stored therein. Because there are a case where the first reading setting information 131A is stored in the first folder 131 and a case where no first reading setting information 131A is stored in the first folder 131, the first reading setting information 131A is indicated by a broken line in FIG. 1.

Similarly, because there are a case where the first read data 131B is stored in the first folder 131 and a case where no first read data 131B is stored in the first folder 131, the first read data 131B is indicated by a broken line in FIG. 1.

The first memory 13 corresponds to an example of a "storage unit".

The first reading setting information 131A corresponds to an example of "reading setting information".

The first read data 131B corresponds to an example of "read data".

When the first reading setting information 131A is stored in the first folder 131, the first reading setting information 131A is a reading condition to be set in the scanner 2 before the scanner 2 generates the first read data 131B to be stored in the first folder 131. The reading condition includes at least one of the following: read resolution, color/monochrome setting, storage format for read data, brightness, and contrast. The storage format for read data includes PDF format, TIFF format, JPEG format, and other format. The color/monochrome setting specifies whether to read out a document in a color mode or in a monochrome mode.

When the first reading setting information 131A is stored in the first folder 131, the first read data 131B is generated by the scanner 2 in which the reading condition is set based on the first reading setting information 131A. The first read data 131B is received from the scanner 2 and stored in the first folder 131 by the storage control unit 122.

When no first reading setting information 131A is stored in the first folder 131, the first reading setting information 131A and the first read data 131B are transmitted from the scanner 2 to the personal computer 1. The first reading setting information 131A and the first read data 131B are received from the scanner 2 by the first communication control unit 121 and stored in the first folder 131 by the storage control unit 122.

The second folder 132 is configured so that second reading setting information 132A and second read data 132B can be stored therein. Because there are a case where the second reading setting information 132A is stored in the second folder 132 and a case where no second reading setting information 132A is stored in the second folder 132, the second reading setting information 132A is indicated by a broken line in FIG. 1.

Similarly, because there are a case where the second read data 132B is stored in the second folder 132 and a case where no second read data 132B is stored in the second folder 132, the second read data 132B is indicated by a broken line in FIG. 1.

The second reading setting information 132A corresponds to an example of "reading setting information".

The second read data 132B corresponds to an example of "read data".

When the second reading setting information 132A is stored in the second folder 132, the second reading setting information 132A is a reading condition to be set in the scanner 2 before the scanner 2 generates the second read data 132B to be stored in the second folder 132.

When the second reading setting information 132A is stored in the second folder 132, the second read data 132B is generated by the scanner 2 in which the reading condition is set based on the second reading setting information 132A. The second read data 132B is received from the scanner 2 and stored in the second folder 132 by the storage control unit 122.

When no second reading setting information 132A is stored in the second folder 132, the second reading setting information 132A and the second read data 132B are transmitted from the scanner 2 to the personal computer 1. The second reading setting information 132A and the second read data 132B are received from the scanner 2 by the first communication control unit 121 and stored in the second folder 132 by the storage control unit 122.

Each of the first folder 131 and the second folder 132 corresponds to an example of a "storage destination folder". The first folder 131 corresponds to an example of a "first storage destination folder". The second folder 132 corresponds to an example of a "second storage destination folder".

When the first reading setting information 131A is stored in the first folder 131, the first communication control unit 121 and the storage control unit 122 perform the following processing.

When the first folder 131 is accessed from the scanner 2 via the first communication interface mechanism 16, the first communication control unit 121 transmits the first reading setting information 131A to the scanner 2 via the first communication interface mechanism 16.

The storage control unit 122 receives the first read data 131B from the scanner 2 via the first communication interface mechanism 16 and stores the first read data 131B in the second folder 132.

When the second reading setting information 132A is stored in the second folder 132, the first communication control unit 121 and the storage control unit 122 perform the following processing.

When the second folder 132 is accessed from the scanner 2 via the first communication interface mechanism 16, the first communication control unit 121 transmits the second reading setting information 132A to the scanner 2 via the first communication interface mechanism 16.

The storage control unit 122 receives the second read data 132B from the scanner 2 via the first communication interface mechanism 16 and stores the second read data 132B in the second folder 132.

As described above, when the first reading setting information 131A is stored in the first folder 131 and when the second reading setting information 132A is stored in the second folder 132, the first communication control unit 121 and the storage control unit 122 perform the similar processing. Therefore, in the following description, a case where the first reading setting information 131A is stored in the first folder 131 will be explained in more detail.

The first communication control unit 121 corresponds to an example of a "communication control unit".

When the first folder 131 is accessed from the first scanner 2A via the first communication interface mechanism 16, the first communication control unit 121 transmits the first reading setting information 131A to the first scanner 2A via the first communication interface mechanism 16.

The storage control unit 122 receives the first read data 131B from the first scanner 2A via the first communication interface mechanism 16 and stores the first read data 131B in the first folder 131.

When the first folder 131 is accessed from the second scanner 2B via the first communication interface mechanism 16, the first communication control unit 121 transmits the first reading setting information 131A to the second scanner 2B via the first communication interface mechanism 16.

The storage control unit 122 receives the first read data 131B from the second scanner 2B via the first communication interface mechanism 16 and stores the first read data 131B in the first folder 131.

When the first folder 131 is accessed from the third scanner 2C via the first communication interface mechanism 16, the first communication control unit 121 transmits the first reading setting information 131A to the third scanner 2C via the first communication interface mechanism 16.

The storage control unit 122 receives the first read data 131B from the third scanner 2C via the first communication interface mechanism 16 and stores the first read data 131B in the first folder 131.

Meanwhile, when no first reading setting information 131A is stored in the first folder 131, the first communication control unit 121 and the storage control unit 122 perform the following processing.

When the first folder 131 is accessed from the scanner 2 via the first communication interface mechanism 16, the first communication control unit 121 transmits a notification NT1 that indicates that no first reading setting information 131A is stored in the first folder 131 to the scanner 2 via the first communication interface mechanism 16.

The storage control unit 122 receives, as the first reading setting information 131A, a set value that has been set in the scanner 2 from the scanner 2 via the first communication interface mechanism 16 and stores the first reading setting information 131A in the first folder 131. In addition, the storage control unit 122 receives the first read data 131B from the scanner 2 via the first communication interface mechanism 16 and stores the first read data 131B in the first folder 131.

When no second reading setting information 132A is stored in the second folder 132, the first communication control unit 121 and the storage control unit 122 perform the following processing.

When the second folder 132 is accessed from the scanner 2 via the first communication interface mechanism 16, the first communication control unit 121 transmits a notification NT2 that indicates that no second reading setting information 132A is stored in the second folder 132 to the scanner 2 via the first communication interface mechanism 16.

The storage control unit 122 receives, as the second reading setting information 132A, a set value that has been set in the scanner 2 from the scanner 2 via the first communication interface mechanism 16 and stores the second reading setting information 132A in the second folder 132. In addition, the storage control unit 122 receives the second read data 132B from the scanner 2 via the first communication interface mechanism 16 and stores the second read data 132B in the second folder 132.

As described above, when no first reading setting information 131A is stored in the first folder 131 and when no second reading setting information 132A is stored in the second folder 132, the first communication control unit 121 and the storage control unit 122 perform the similar processing. Therefore, in the following description, a case where no first reading setting information 131A is stored in the first folder 131 will be explained in more detail.

When the first folder 131 is accessed from the first scanner 2A via the first communication interface mechanism 16, the first communication control unit 121 transmits the notification NT1, which indicates that no first reading setting information 131A is stored in the first folder 131, to the first scanner 2A via the first communication interface mechanism 16.

The storage control unit 122 receives first unique reading setting information 233A that indicates a set value that has been set in the first scanner 2A from the first scanner 2A via the first communication interface mechanism 16 and stores, as the first reading setting information 131A, the first unique reading setting information 233A in the first folder 131. The storage control unit 122 receives the first read data 131B from the first scanner 2A via the first communication interface mechanism 16 and stores the first read data 131B in the first folder 131.

The first unique reading setting information 233A will be described with reference to FIG. 2.

When the first folder 131 is accessed from the second scanner 2B via the first communication interface mechanism 16, the first communication control unit 121 transmits the notification NT1, which indicates that no first reading setting information 131A is stored in the first folder 131, to the second scanner 2B via the first communication interface mechanism 16.

The storage control unit 122 receives second unique reading setting information 233B that indicates a set value that has been set in the second scanner 2B from the second scanner 2B via the first communication interface mechanism 16 and stores, as the first reading setting information 131A, the second unique reading setting information 233B in the first folder 131. The storage control unit 122 receives the first read data 131B from the second scanner 2B via the first communication interface mechanism 16 and stores the first read data 131B in the first folder 131.

The second unique reading setting information 233B is stored in a second memory 23 of the second scanner 2B. The second memory 23 will be explained with reference to FIG. 2.

When the first folder 131 is accessed from the third scanner 2C via the first communication interface mechanism 16, the first communication control unit 121 transmits the notification NT1, which indicates that no first reading setting information 131A is stored in the first folder 131, to the third scanner 2C via the first communication interface mechanism 16.

The storage control unit 122 receives third unique reading setting information 233C that indicates a set value that has been set in the third scanner 2C from the third scanner 2C via the first communication interface mechanism 16 and stores, as the first reading setting information 131A, the third unique reading setting information 233C in the first folder 131. The storage control unit 122 receives the first read data 131B from the third scanner 2C via the first communication interface mechanism 16 and stores the first read data 131B in the first folder 131.

The third unique reading setting information 233C is stored in a second memory 23 of the third scanner 2C. The second memory 23 will be explained with reference to FIG. 2.

FIG. 2 is a diagram illustrating an example of a configuration of the scanner 2 according to the present embodiment. The first scanner 2A, the second scanner 2B, and the third scanner 2C have substantially the same configuration. Thus, FIG. 2 shows a configuration of the scanner 2. To individually indicate the configuration for each of the first scanner 2A, the second scanner 2B, and the third scanner 2C, corresponding one of the reference sings A, B and C is denoted.

As shown in FIG. 2, the first scanner 2A includes a second control unit 21, a second input mechanism 24, a second display mechanism 25, a second communication interface mechanism 26, and a reading mechanism 27.

The second control unit 21 controls operation of each unit of the first scanner 2A.

The second input mechanism 24 receives an input from a user, generates an input signal corresponding to the received input, and transmits the input signal to the second control unit 21. The second input mechanism 24 is formed with various hardware keys and a touch panel or a similar device.

The second display mechanism 25 is a display screen such as an LCD, and displays various images on the display screen according to instructions from the second control unit 21. When the second input mechanism 24 is formed with a touch panel, the touch panel may function as the second display mechanism 25.

The second communication interface mechanism 26 is configured to communicate with the personal computer 1 via the network NW according to an instruction from the second control unit 21. The second communication interface mechanism 26 communicates with the personal computer 1 in accordance with the Ethernet (registered trademark) standards.

The reading mechanism 27 includes an image sensor such as charge coupled device (CCD) or a complementary metal-oxide-semiconductor (C-MOS). The reading mechanism 27 reads out an image printed on a recording medium such as recording paper and generates image information according to an instruction from the second control unit 21.

The second control unit 21 is a controller including a second processor 22 and a second memory 23.

The second memory 23 is a storage device that stores programs to be executed by the second processor 22 and data in a non-volatile manner. The second memory 23 is a magnetic storage device such as an HDD, a semiconductor storage device such as an SSD, a semiconductor storage element such as a flash ROM, or another kind of non-volatile storage device. The second memory 23 may include an RAM that forms a work area for the second processor 22. The second memory 23 stores data to be processed by the second control unit 21 and a second control program PG2 to be executed by the second processor 22.

The second processor 22 may be formed from a single processor, or a plurality of processors may be configured to function as the second processor 22. The second processor 22 controls each unit of the first scanner 2A by executing the second control program PG2.

Although, in the present embodiment, the second processor 22 controls each unit of the first scanner 2A by executing the second control program PG2, the second control unit 21 may control each unit of the first scanner 2A by executing processing of a function mounted on an ASIC or by executing signal processing in a signal processing circuit.

The second control unit 21 includes a reception unit 221, an acquisition unit 222, a setting unit 223, a reading unit 224, a second communication control unit 225, and a setting information storage unit 231. By executing the second control program PG2, the second processor 22 functions as the reception unit 221, the acquisition unit 222, the setting unit 223, the reading unit 224, and the second communication control unit 225. By executing the second control program PG2, the second processor 22 causes the second memory 23 to function as the setting information storage unit 231.

The setting information storage unit 231 stores unique reading setting information 233 that indicates a reading condition set value that has been set in advance in the scanner 2.

When the scanner 2 is the first scanner 2A, the setting information storage unit 231 stores the first unique reading setting information 233A indicating a reading condition set value that has been set in advance in the first scanner 2A. When the scanner 2 is the second scanner 2B, the setting information storage unit 231 stores the second unique reading setting information 233B indicating a reading condition set value that has been set in advance in the second scanner 2B. When the scanner 2 is the third scanner 2C, the setting information storage unit 231 stores the third unique reading setting information 233C indicating a reading condition set value that has been set in advance in the third scanner 2C.

When the acquisition unit 222 receives the notification NT1, which indicates that no first reading setting information 131A is stored in the first folder 131, or the notification NT2, which indicates that no second reading setting information 132A is stored in the second folder 132, from the first communication control unit 121 of the personal computer 1, the setting unit 223 and the second communication control unit 225 execute the following processing.

The setting unit 223 retrieves the unique reading setting information 233 from the setting information storage unit 231 and sets, in the reading mechanism 27, a set value corresponding to the unique reading setting information 233. The second communication control unit 225 retrieves the unique reading setting information 233 from the setting information storage unit 231 and transmits the unique reading setting information 233 to the personal computer 1.

The reception unit 221 receives instruction data CM. The instruction data CM is a read instruction that instructs reading of an image for which the first folder 131 or the second folder 132 is specified as the storage destination for read data. Note that the instruction data CM is generated by the second input mechanism 24 based on operation of a user and is output to the second control unit 21.

When the reception unit 221 receives the instruction data CM, the acquisition unit 222 accesses to the first folder 131 or the second folder 132 of the personal computer 1 to acquire the first reading setting information 131A in the first folder 131 or the second reading setting information 132A in the second folder 132.

When the instruction data CM indicates that the storage destination for read data is the first folder 131, the acquisition unit 222 accesses to the first folder 131 of the personal computer 1 to acquire the first reading setting information 131A in the first folder 131. When the instruction data CM indicates that the storage destination for read data is the second folder 132, the acquisition unit 222 accesses to the second folder 132 of the personal computer 1 to acquire the second reading setting information 132A in the second folder 132.

The setting unit 223 sets a reading condition based on the first reading setting information 131A or the second reading setting information 132A. When the instruction data CM indicates that the storage destination for read data is the first folder 131, the setting unit 223 sets a reading condition based on the first reading setting information 131A. When the instruction data CM indicates that the storage destination for read data is the second folder 132, the setting unit 223 sets a reading condition based on the second reading setting information 132A.

When no first reading setting information 131A is stored in the first folder 131 or when no second reading setting information 132A is stored in the second folder 132, the setting unit 223 retrieves the unique reading setting information 233 from the setting information storage unit 231 and sets a reading condition based on the unique reading setting information 233.

Although, in the present embodiment, the setting unit 223 retrieves the unique reading setting information 233 from the setting information storage unit 231 to set a reading condition based on the unique reading setting information 233 when no first reading setting information 131A is stored in the first folder 131 or when no second reading setting information 132A is stored in the second folder 132, the configuration is not limited thereto. When no first reading setting information 131A is stored in the first folder 131 or when no second reading setting information 132A is stored in the second folder 132, the setting unit 223 may transmit a request for reading setting information to the personal computer 1. In this case, a more appropriate reading condition can be set.

The reading unit 224 reads out an image under the reading condition set by the setting unit 223, and generates read data. When the acquisition unit 222 accesses to the first folder 131 of the personal computer 1, the reading unit 224 generates the first read data 131B. When the acquisition unit 222 accesses to the second folder 132 of the personal computer 1, the reading unit 224 generates the second read data 132B.

When the instruction data CM indicates that the storage destination for read data is the first folder 131 and when no first reading setting information 131A is stored in the first folder 131, the second communication control unit 225 receives the notification NT1 indicating that no first reading setting information 131A is stored in the first folder 131.

When the instruction data CM indicates that the storage destination for read data is the second folder 132 and when no second reading setting information 132A is stored in the second folder 132, the second communication control unit 225 receives the notification NT2 indicating that no second reading setting information 132A is stored in the second folder 132.

When no first reading setting information 131A is stored in the first folder 131 or when no second reading setting information 132A is stored in the second folder 132, the second communication control unit 225 transmits the unique reading setting information 233 to the first folder 131 or the second folder 132.

When the acquisition unit 222 accesses to the first folder 131 of the personal computer 1 and the reading unit 224 finishes reading out of an image, the second communication control unit 225 transmits the first read data 131B to the first folder 131. When the acquisition unit 222 accesses to the second folder 132 of the personal computer 1 and the reading unit 224 finishes reading out of an image, the second communication control unit 225 transmits the second read data 132B to the second folder 132.

Figure 3:
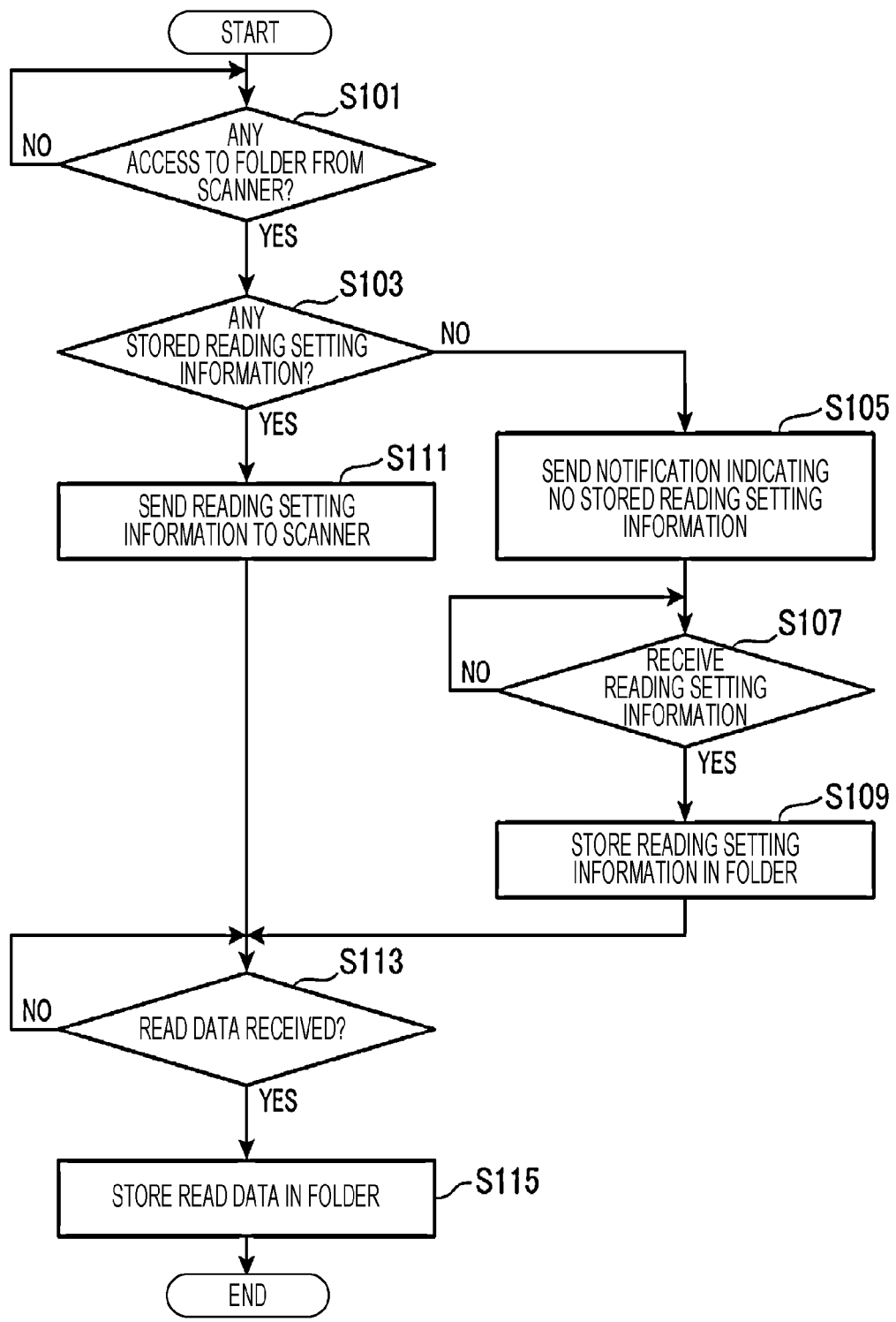
FIG. 3 is a flowchart illustrating an example of processing of a personal computer.

FIG. 3 is a flowchart illustrating an example of processing of the first control unit 11 of the personal computer 1.

As shown in FIG. 3, in step S101, the first communication control unit 121 determines whether or not the first folder 131 or the second folder 132 is accessed from the scanner 2. For the sake of convenience of description, a case where the first folder 131 is accessed from the first scanner 2A will be explained below. The first communication control unit 121 determines whether or not the first folder 131 is accessed from the first scanner 2A.

When the first communication control unit 121 determines that the first folder 131 is not accessed from the first scanner 2A (NO in step S101), the process enters a standby state. When the first communication control unit 121 determines that the first folder 131 is accessed from the first scanner 2A (Yes in step S101), the process proceeds to step S103.

In step S103, the first communication control unit 121 determines whether or not the first reading setting information 131A is stored in the first folder 131.

When the first communication control unit 121 determines that the first reading setting information 131A is stored in the first folder 131 (YES in step S103), the process proceeds to step S111.

In step S111, the first communication control unit 121 transmits the first reading setting information 131A to the first scanner 2A. Then, the process proceeds to step S113.

When the first communication control unit 121 determines that no first reading setting information 131A is stored in the first folder 131 (NO in step S103), the process proceeds to step S105.

In Step S105, the first communication control unit 121 transmits the notification NT1, which indicates that no first reading setting information 131A is stored in the first folder 131, to the first scanner 2A.

After transmitting the notification NT1 to the first scanner 2A, the first communication control unit 121 determines whether or not the first unique reading setting information 233A is received from the first scanner 2A in step S107.

When the first communication control unit 121 determines that no first unique reading setting information 233A is received from the first scanner 2A (NO in step S107), the process enters a standby state. When the first communication control unit 121 determines that the first unique reading setting information 233A is received from the first scanner 2A (YES in step S107), the process proceeds to step S109.

In step S109, the storage control unit 122 stores the first unique reading setting information 233A as the first reading setting information 131A in the first folder 131. Then, the process proceeds to step S113.

After the storage control unit 122 stores the first unique reading setting information 233A as the first reading setting information 131A in the first folder 131, the first communication control unit 121 determines whether or not the first read data 131B is received from the first scanner 2A in step S113.

When the first communication control unit 121 determines that no first read data 131B is received from the first scanner 2A (NO in step S113), the process enters a standby state. When the first communication control unit 121 determines that the first read data 131B is received from the first scanner 2A (YES in step S113), the process proceeds to step S115.

In step S115, the storage control unit 122 stores the first read data 131B in the first folder 131. Then, the process is ended.

Figure 4:
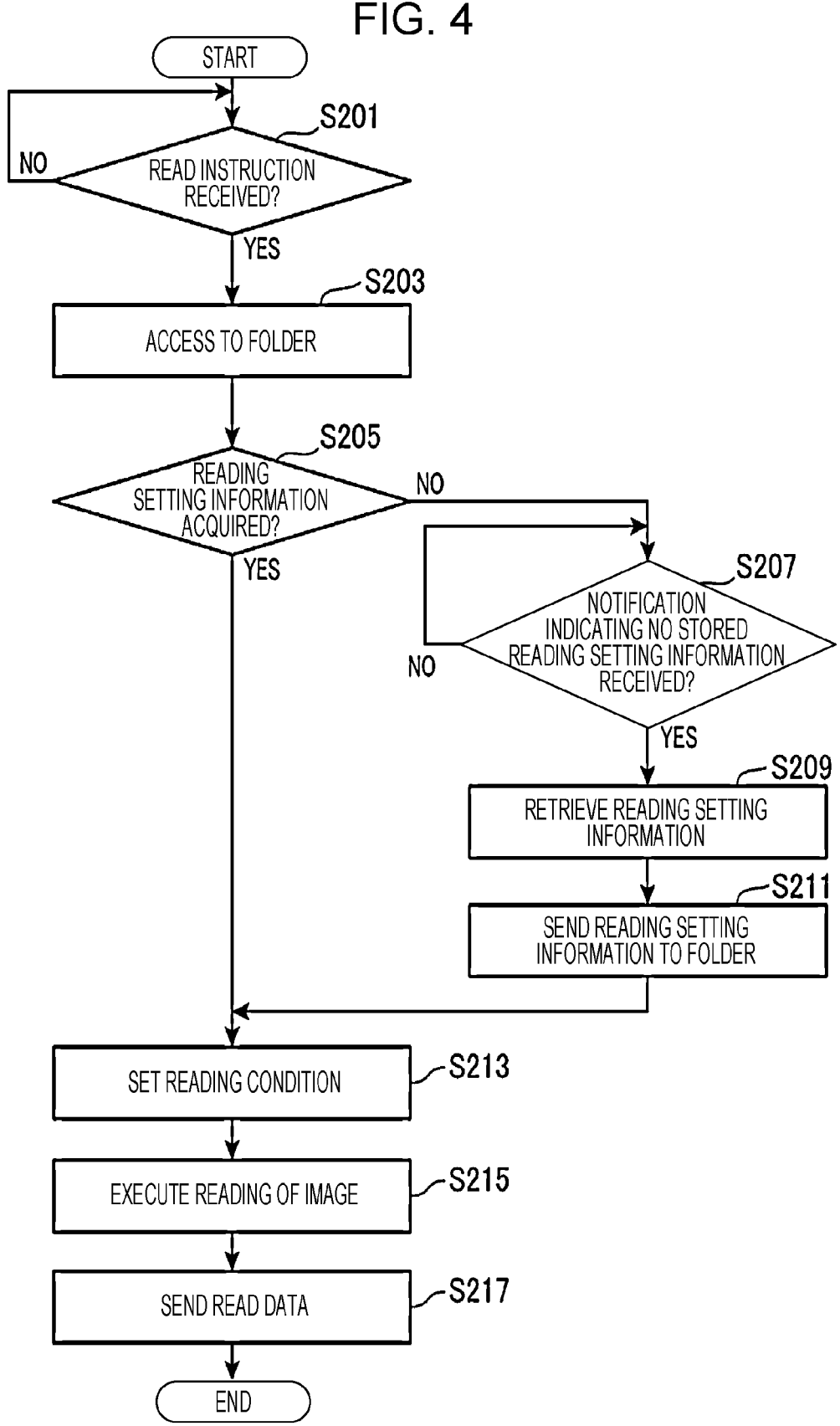
FIG. 4 is a flowchart illustrating an example of processing of a scanner.

FIG. 4 is a flowchart illustrating an example of processing of the second control unit 21 of the scanner 2. FIG. 4 shows a case where the first scanner 2A accesses to the first folder 131 of the first control unit 11 of the personal computer 1.

As shown in FIG. 4, in step S201, the reception unit 221 determines whether or not the instruction data CM that instructs reading of an image for which the first folder 131 is specified as the storage destination for read data is received.

When the reception unit 221 determines that no instruction data CM is received (NO in step S201), the process enters a standby state. When the reception unit 221 determines that the instruction data CM is received (YES in step S201), the process proceeds to step S203.

In step S203, the acquisition unit 222 accesses to the first folder 131 in the personal computer 1.

In step S205, the acquisition unit 222 determines whether or not the first reading setting information 131A is acquired from the personal computer 1.

When the acquisition unit 222 determines that the first reading setting information 131A is acquired (YES in step S205), the process proceeds to step S213. When the acquisition unit 222 determines that no first reading setting information 131A is acquired (NO in step S205), the process proceeds to step S207.

In step S207, the second communication control unit 225 determines whether or not the notification NT1 indicating that no first reading setting information 131A is stored in the first folder 131 is received.

When the second communication control unit 225 determines that no notification NT1 is received (NO in step S207), the process enters a standby state. When the second communication control unit 225 determines that the notification NT1 is received (YES in step S207), the process proceeds to step S209.

In step S209, the setting unit 223 retrieves the first unique reading setting information 233A from the setting information storage unit 231.

In step S211, the second communication control unit 225 transmits the first unique reading setting information 233A to the first folder 131 of the first control unit 11 of the personal computer 1.

In step S213, the setting unit 223 sets a reading condition based on the first unique reading setting information 233A or the first reading setting information 131A.

After the reading condition is set by the setting unit 223, the reading unit 224 reads out an image under the reading condition and generates the first read data 131B in step S215.

In step S217, the second communication control unit 225 transmits the first read data 131B to the first folder 131 of the personal computer 1. Then, the process is ended.

As described with reference to FIGS. 3 and 4, when the first reading setting information 131A is stored in the first folder 131, the scanner 2 sets a reading condition based on the first reading setting information 131A. The scanner 2 generates the first read data 131B and transmits the first read data 131B to the first folder 131 of the personal computer 1. Therefore, by setting a reading condition based on the first reading setting information 131A and by reading out an image under the reading condition, the first read data 131B to be stored in the first folder 131 can be generated.

As described with reference to FIGS. 3 and 4, when no first reading setting information 131A is stored in the first folder 131, the scanner 2 sets a reading condition based on the unique reading setting information 233. The scanner 2 generates the first read data 131B and transmits the first read data 131B to the first folder 131 of the personal computer 1. Therefore, by setting a reading condition based on the unique reading setting information 233 and by reading out an image under the reading condition, the first read data 131B to be stored in the first folder 131 can be generated.

Because the scanner 2 transmits the unique reading setting information 233 to the first folder 131 of the personal computer 1, the personal computer 1 can store the unique reading setting information 233 as the first reading setting information 131A in the first folder 131.

As described with reference to FIGS. 1 to 4, the image reading system 100 according to the present embodiment includes the first scanner 2A that reads out an image and the personal computer 1 configured to be connected to the first scanner 2A. The personal computer 1 includes the first communication interface mechanism 16 configured to communicate with the first scanner 2A and the first memory 13 that stores the first reading setting information 131A in the first folder 131. The first scanner 2A includes the reception unit 221 that receives the instruction data CM, which instructs reading of an image for which the first folder 131 is specified as the storage destination for read data, the acquisition unit 222 that, when the reception unit 221 receives the instruction data CM, accesses to the first folder 131 of the personal computer 1 to acquire the first reading setting information 131A from the first folder 131, the setting unit 223 that sets a reading condition based on the first reading setting information 131A, and the reading unit 224 that reads out an image under the reading condition and generates read data.

Based on the first reading setting information 131A stored in the first folder 131, a reading condition can be set and read data can be generated. Therefore, a storage destination folder and a reading condition can be set with a simple configuration. Consequently, there is no need to store a reading method table having a large capacity.

The personal computer 1 is communicably connected to the second scanner 2B via the first communication interface mechanism 16. When the first folder 131 is accessed from the second scanner 2B via the first communication interface mechanism 16, the personal computer 1 transmits the first reading setting information 131A stored in the first folder 131 to the second scanner 2B via the first communication interface mechanism 16.

Based on the first reading setting information 131A received from the personal computer 1, the second scanner 2B can set a reading condition and generate read data. Regarding also the second scanner 2B, a storage destination folder and a reading condition can be set with a simple configuration. Consequently, there is no need to store a reading method table having a large capacity.

The first memory 13 of the personal computer 1 includes the first folder 131 and the second folder 132. The first memory 13 stores the first reading setting information 131A in the first folder 131 and stores the second reading setting information 132A in the second folder 132.

Based on the first reading setting information 131A stored in the first folder 131A, the first scanner 2A can set a reading condition and generate read data. Based on the second reading setting information 132A stored in the second folder 132A, the first scanner 2A can set a reading condition. The 2A can generate read data under the reading condition. Therefore, a storage destination folder and a reading condition can be set with a simple configuration.

The reading condition includes read resolution, color/monochrome setting, read data storage format, brightness, and contrast.

Therefore, the reading condition can be set appropriately.

In a case where no first reading setting information 131A is stored in the first folder 131 when the first scanner 2A accesses to the first folder 131, the first scanner 2A reads out an image by using a set value being set in the first scanner 2A and transmits the set value as the first reading setting information 131A to the first folder 131. The personal computer 1 stores the set value received from the first scanner 2A via the first communication interface mechanism 16 in the first folder 131 as the first reading setting information 131A.

When no first reading setting information 131A is stored in the first folder 131, the unique reading setting information 233 can be stored as the first reading setting information 131A. Therefore, the first reading setting information 131A can be stored appropriately.

In a case where no first reading setting information 131A is stored in the first folder 131 when the first scanner 2A accesses to the first folder 131, the first scanner 2A transmits a request for the first reading setting information 131A to the personal computer 1.

Thus, the first reading setting information 131A can be generated in the personal computer 1 and transmitted to the first scanner 2A from the personal computer 1. Therefore, an appropriate reading condition can be set in the first scanner 2A.

The personal computer 1 according to the present embodiment is connected to the first scanner 2A that reads out an image and generates read data. The personal computer 1 includes the first communication interface mechanism 16 that communicates with the first scanner 2A, the first memory 13 that stores the first reading setting information 131A in the first folder 131, and the first communication control unit 121 that transmits the first reading setting information 131A to the first scanner 2A via the first communication interface mechanism 16 when the first scanner 2A accesses to the first folder 131 via the first communication interface mechanism 16.

Because the first reading setting information 131A is transmitted to the first scanner 2A when the first folder 131 is accessed from the first scanner 2A, the first scanner 2A can set a reading condition and generate read data based on the first reading setting information 131A. Therefore, a storage destination folder and a reading condition can be set with a simple configuration. Consequently, there is no need to store a reading method table having a large capacity.

When the first folder 131 is accessed from the first scanner 2A via the first communication interface mechanism 16 and the first read data 131B is received from the first scanner 2A, the personal computer 1 stores the received first read data 131B in the first folder 131.

Therefore, because a reading condition and read data can be stored in the storage destination folder, there is no need to store a reading method table having a large capacity.

When the personal computer 1 is communicably connected to the second scanner 2B via the first communication interface mechanism 16 and the first folder 131 thereof is accessed from the second scanner 2B via the first communication interface mechanism 16, the first communication control unit 121 transmits the first reading setting information 131A stored in the first folder 131 to the second scanner 2B via the first communication interface mechanism 16.

Based on the first reading setting information 131A received from the personal computer 1, the second scanner 2B can set a reading condition and generate read data. Therefore, regarding also the second scanner 2B, a storage destination folder and a reading condition can be set with a simple configuration. Consequently, there is no need to store a reading method table having a large capacity.

The first memory 13 of the personal computer 1 includes the first folder 131 and the second folder 132. The first memory 13 stores the first reading setting information 131A in the first folder 131 and stores the second reading setting information 132A in the second folder 132.

Based on the first reading setting information 131A stored in the first folder 131, the first scanner 2A can set a reading condition and generate read data. Based on the second reading setting information 132A stored in the second folder 132, the first scanner 2A can set a reading condition.

Therefore, a storage destination folder and a reading condition can be set with a simple configuration.

The present disclosure is not limited to the configuration of the embodiment described above. Various modifications are conceivable within the scope of the present disclosure.

In the present embodiment, a case where the "information processing apparatus" is the personal computer 1 is explained, but the "information processing apparatus" is not limited thereto. The "information processing apparatus" may be a server device, for example. In addition, the "information processing apparatus" may be a tablet terminal or a smartphone.

In the present embodiment, a case where the "image reading apparatus" is the scanner 2 is explained, but the "image reading apparatus" is not limited thereto. The "image reading apparatus" may be a copying machine or a multi-function machine having a facsimile function, for example, as long as the machine has an image reading function.

In the present embodiment, a case where the personal computer 1 is communicably connected to the first scanner 2A, the second scanner 2B, and the third scanner 2C is described, but the configuration is not limited thereto. The personal computer 1 needs to be communicably connected to at least one of the scanners 2. The personal computer 1 may be communicably connected to one scanner 2, two scanners 2, or four or more scanners 2.

In the present embodiment, a case where the reading condition to be set in the scanner 2 includes read resolution, color/monochrome setting, read data storage format, brightness, and contrast is described, but the reading condition is not limited thereto. The reading condition to be set in the scanner 2 may include at least one of read resolution, color/monochrome setting, read data storage format, brightness, and contrast.

At least some of the functional blocks shown in FIGS. 1 and 2 may be realized by hardware or by hardware and software. The function configuration is not limited to the configuration in which independent hardware resources are arranged as shown in the figures.

The first control program PG1 to be executed by the first processor 12 of the first control unit 11 in the personal computer 1 is stored in the first memory 13, but the first control program PG1 may be stored in an HDD or a similar device. The second control program PG2 to be executed by the second processor 22 of the second control unit 21 in the scanner 2 is stored in the second memory 23, but the second control program PG2 may be stored in an HDD or a similar device.

The processing units of the flowcharts shown in FIGS. 3 and 4 are formed by diving the process of the first control unit 11 of the personal computer 1 and the process of the second control unit 21 of the scanner 2 for main processing contents to facilitate understanding of the processes. The embodiment shall not be limited by the way of dividing and the names for the processing units shown in the flowcharts of FIGS. 3 and 4. According to the processing contents, the process of the first control unit 11 and the process of the second control unit 21 may be divided into smaller processing units, or may be divided into larger processing units so that one processing unit includes more processes. The processing sequences of the flowcharts are not limited to the examples shown in the figures.

The image reading method of the personal computer 1 can be realized by causing the first processor 12 of the first control unit 11 of the personal computer 1 to execute the first control program PG1 corresponding to the image reading method of the personal computer 1. The first control program PG1 can be stored in a computer-readable recording medium. As the recording medium, a magnetic recording medium, an optical recording medium, or a semiconductor memory device can be used. The specific examples include portable recording media and fixed-type recording media such as a flexible disk, a compact disk read only memory (CD-ROM), a digital versatile disc (DVD), a Blu-ray (registered trademark) disc, a magneto-optical disk, a flash memory, and a card-type recording medium. In addition, the recording medium may be a non-volatile recording medium such as a RAM, a ROM, an HDD or the like which is an internal storage device provided in the personal computer 1. The image reading method of the personal computer 1 can be realized by storing the first control program PG1 corresponding to the image reading method of the personal computer 1 in a server device or the like and downloading the first control program PG1 to the personal computer 1 from the server device.

What is claimed is:

1. An image reading system comprising:
a first image reading apparatus that reads out a document; and
an information processing apparatus configured to be connected to the first image reading apparatus,
the information processing apparatus including a communication interface unit configured to communicate with the first image reading apparatus, and a storage unit that stores a storage destination folder having reading setting information,
the first image reading apparatus including
a reception unit that receives a read instruction that specifies the storage destination folder as a storage destination of read data,
an acquisition unit that, when the reception unit receives the read instruction, accesses storage destination folder of the information processing apparatus and acquires the reading setting information from the storage destination folder,
a setting unit that sets a reading condition based on the reading setting information, and
a reading unit that reads out the document under the reading condition and generates the read data, wherein
in a case in which no reading setting information is stored in the storage destination folder when the first image reading apparatus accesses the storage destination folder, the first image reading apparatus transmits a request for the reading setting information to the information processing apparatus.

2. The image reading system according to claim 1, wherein
the information processing apparatus is communicably connected to a second image reading apparatus via the communication interface unit and, when the second image reading apparatus accesses to the storage destination folder via the communication interface unit, transmits the reading setting information stored in the storage destination folder to the second image reading apparatus via the communication interface unit.

3. The image reading system according to claim 1, wherein
the storage unit stores a second storage destination folder that is different from the storage destination folder, and
the second storage destination folder has second reading setting information.

4. The image reading system according to claim 1, wherein
the reading condition includes at least one of read resolution, color/monochrome setting, read data storage format, brightness, and contrast.

5. An image reading apparatus comprising:
a reception unit that receives a read instruction that specifies the storage destination folder as a storage destination of read data,
an acquisition unit that, when the reception unit receives the read instruction, accesses the storage destination folder and acquires a reading setting information from the storage destination folder,
a setting unit that sets a reading condition based on the reading setting information, and
a reading unit that reads out the document under the reading condition and generates the read data, wherein
in a case in which no reading setting information is stored in the storage destination folder when the first image reading apparatus accesses to the storage destination folder, the first image reading apparatus performs reading with a set value being set in the first image reading apparatus and transmits the set value as the reading setting information to the storage destination folder, and
the information processing apparatus stores, in the storage destination folder, the set value received from the first image reading apparatus via the communication interface unit as the reading setting information.

6. A first image reading apparatus comprising:
a reception unit that receives a read instruction that specifies a storage destination folder as a storage destination of read data,
an acquisition unit that, when the reception unit receives the read instruction, accesses to the storage destination folder and acquires a reading setting information from the storage destination folder,
a setting unit that sets a reading condition based on the reading setting information, and
a reading unit that reads out the document under the reading condition and generates the read data;
wherein in a case in which no reading setting information is stored in the storage destination folder when the first image reading apparatus accesses to the storage destination folder, the first image reading apparatus requests the reading setting information.

* * * * *